Figure 7:
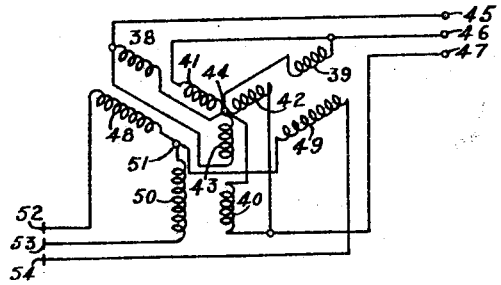

Aug. 16, 1932.  E. Y. ROBINSON ET AL  1,872,009
THERMIONIC RECTIFIER SYSTEM
Filed Aug. 28, 1925  3 Sheets-Sheet 1
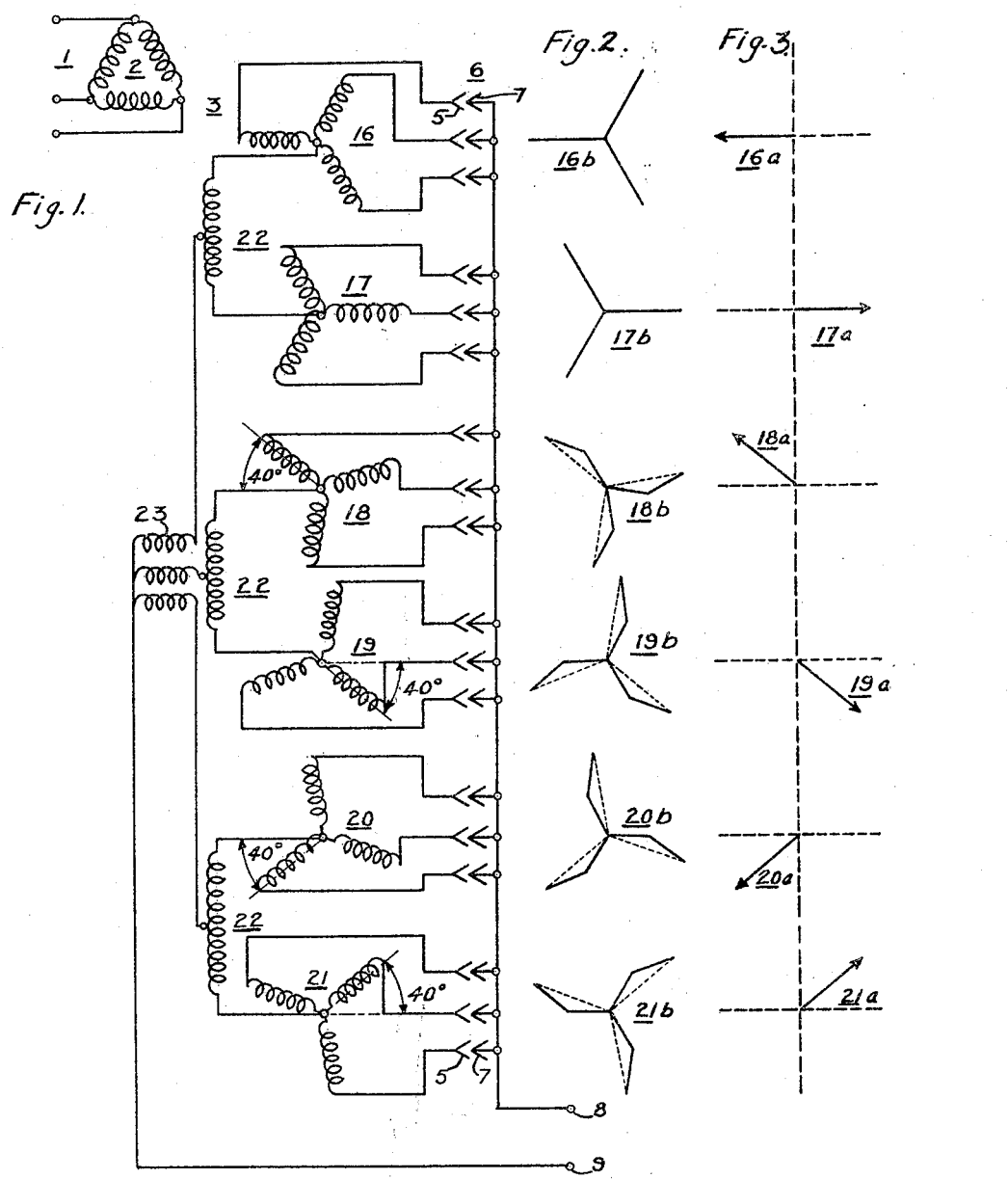
WITNESSES:
INVENTORS.
Ernest Yeoman Robinson
Cecil Reginald Burch
BY
ATTORNEY

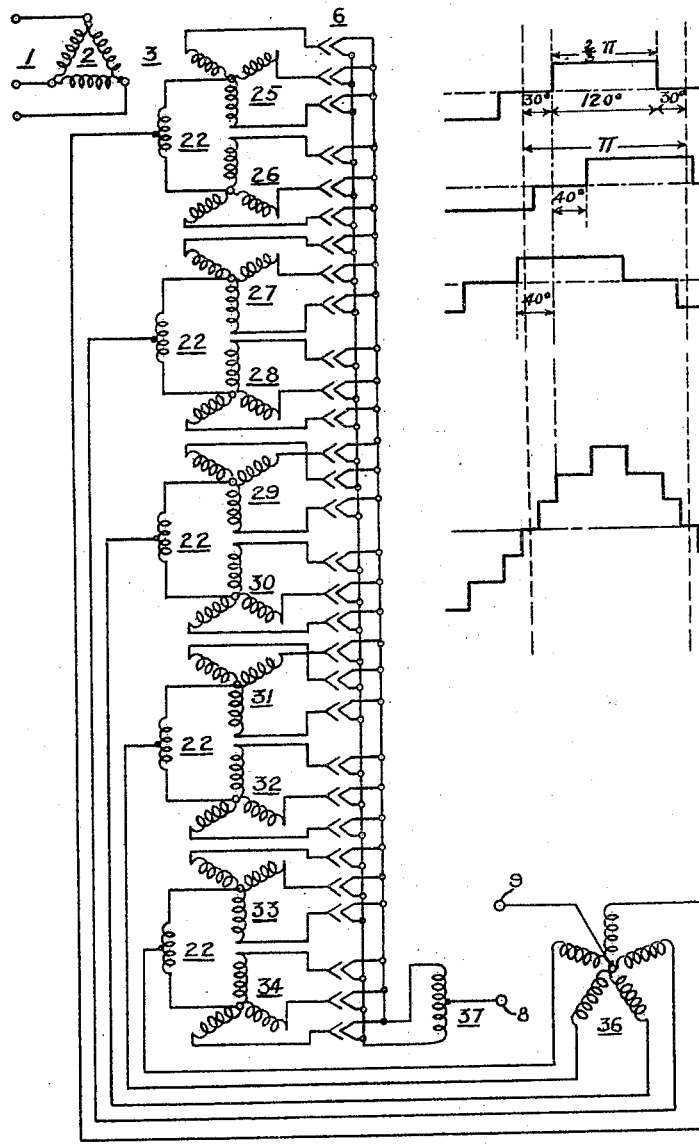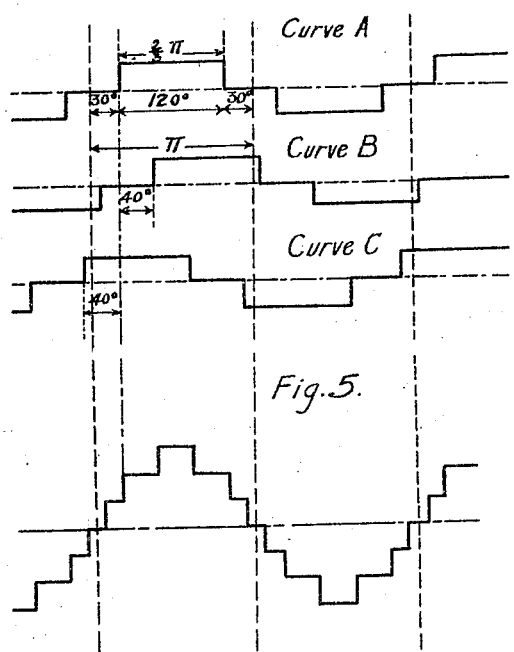

Aug. 16, 1932.   E. Y. ROBINSON ET AL   1,872,009
THERMIONIC RECTIFIER SYSTEM
Filed Aug. 28, 1925   3 Sheets-Sheet 3

INVENTORS.
Ernest Yeoman Robinson
Cecil Reginald Burch
BY Wesley G. Carr
ATTORNEY Patented Aug. 16, 1932

1,872,009

UNITED STATES PATENT OFFICE

ERNEST YEOMAN ROBINSON, OF LYMM, AND CECIL REGINALD BURCH, OF STRETFORD, MANCHESTER, ENGLAND, ASSIGNORS TO ASSOCIATED ELECTRICAL INDUSTRIES LIMITED, A BRITISH COMPANY

THERMIONIC RECTIFIER SYSTEM

Application filed August 28, 1925. Serial No. 53,202.

This invention relates to thermionic rectifier systems for polyphase electric currents. In such systems as heretofore devised there are created a plurality of harmonics which are of relatively large amplitude. Thus, in an ordinary half-way rectifier for three-phase currents the latter are supplied to the primary winding of a transformer, the secondary winding of which is star-connected and has the phase legs thereof connected respectively to the anodes of three thermionic rectifiers. The two conductors of the direct-current output circuit are connected respectively to the cathodes of the rectifiers and to the star-point of the secondary winding of the transformer. With this arrangement a considerable number of harmonics of the fundamental frequency is present in the alternating current input circuit. There is the second harmonic having an amplitude which is 50 per cent of that of the fundamental current; there is the fourth harmonic having an amplitude which is 25 per cent of the fundamental current; the fifth harmonic has an amplitude of 20 per cent of the fundamental current; the seventh harmonic has an amplitude of 14.3 per cent of the fundamental current; and so on. Further, there is a considerable alternating-current component and harmonics thereof in the output circuit unless suitable rejectors are employed. Since the rectifiers are of the half-wave type each valve will pass current during one-third of a cycle.

The harmonic components as mentioned above may be reduced by employing a six-phase rectifier system comprising six thermionic rectifiers connected respectively to the phase legs of a six-phase star-wound secondary winding af the input transformer. By this arrangement the harmonic components of the input as well as the output are considerably reduced. Thus the lowest harmonic present in the output is the sixth and there are no even harmonics in the input. However, the arrangement possesses the disadvantage that each rectifying valve is only operative during 60 degrees or $\pi/3$ electrical radians of a cycle instead of during 120 degrees or $2\pi/3$ radians as in the ordinary three-phase rectifier. Consequently the output of each thermionic rectifier is halved. Moreover, in rectifiers in which the inter-electrode gap is short the main loss is due to that entailed in heating the cathodes and in this respect the efficiency of the system will be reduced.

With a view to obtaining a reduction in harmonics such as is possible with a six-phase rectifier system whilst retaining the 120 degrees operating period of each thermionic rectifier as in the ordinary simple three-phase rectifier first hereinafter mentioned, it has been proposed to employ two three-phase half-wave rectifiers having a phase displacement of 180 degrees with respect to one another. In such method, which may be termed the double-Y method, three anodes of the six valves involved are connected to the respective phase legs of one secondary input transformer winding whilst the remaining three anodes are connected to the respective phase legs on another similar secondary transformer winding wound upon the same core as the aforementioned secondary winding but electrically isolated therefrom and connected so as to obtain the necessary 180 degrees phase displacement with respect thereto. The two three-phase rectifier units thus constituted are caused to operate so that each one will share the load and each rectifying valve will pass current during 120 degrees of a cycle by connecting the star-points of the two secondary windings together through a choke coil or interphase reactance to the mid-point of which one of the direct-current output leads is connected, the other lead being connected to the cathodes. Or instead of the choke coil or inter-phase reactance two independent choke coils may be used. Or the star-points of the two secondary windings may be directly connected together and the choke coils inserted in the output circuit connection to the cathodes of the respective three-phase rectifiers.

In a modification of the arrangement just above described the input transformer has an ordinary six-phase star-connected secondary winding the alternate phase legs of which are connected respectively to the three anodes of one rectifier unit, whilst the remaining phase legs are connected respectively to the anodes of another three-phase rectifier unit. One of the output leads is connected to the star-point of the transformer secondary winding whilst the other output lead is connected to the mid-point of a choke coil the terminals of which are connected respectively to the cathodes of the two three-phase rectifiers. With any of these arrangements the input harmonics are considerably reduced. In fact, all the even harmonics are eliminated.

According to the present invention, which has for its object a still further reduction in the harmonics in both the input and output sides of the rectifiers, the current to be rectified is either generated as, or converted into, Q-phase current where Q is an even and relatively high number and equal to 2NM, where N is a number greater than one and preferably odd and prime, or is the product of two or more odd prime numbers, and M is odd and prime and not less than three while it is preferably three, and said 2NM-phase current is rectified by means of 2NM-phase half-wave rectifier units which are phase displaced by $$\frac{\pi}{MN}$$

electrical radians, means being provided whereby each rectifier unit operates in effect substantially as an independent M-phase half-wave rectifier, that is to say, each valve passes current for substantially $2\pi/M$ electrical radians during each cycle. The means for ensuring that each M-phase rectifier operates in this manner preferably consists of a star-wound 2N-phase reactance, the phase windings of which are connected to the rectifier units and the star-point of which is connected to one of the output terminals, or such reactance may be replaced by separate single phase reactances, or by a combination of polyphase reactances. To these ends the 2N rectifier units may be conveniently divided into N double units each consisting of two single units having a phase displacement of 180 degrees with respect to one another as in the double-Y units previously herein referred to but such arrangement is not essential. Each such unit may be caused to share the load equally by means of an interphase reactance having a mid-point connection as previously herein described whilst the load between the several double units may be caused to be equally shared by the insertion of respective choke coils between the several mid-point connections aforesaid and the output circuit. The other output circuit lead is connected to the cathodes of the rectifying valves.

In one example of the invention in which $M=3$ the current may be generated as or converted into eighteen phase current by the employment of three double-Y units, namely $2MN=18$. This eighteen phase current is then rectified by the six three-phase half-wave rectifiers which are phase displaced by an angle $\theta$ where $$\theta = \frac{2\pi}{2MN} = \frac{360°}{18} = 20°$$

In another example where $N=5$, $$2MN = 30 \text{ and } \theta = \frac{360°}{30} = 12°$$

In carrying out the invention in the case where $N=3$ and $M=3$ the supply transformer may be provided with six completely independent star-wound secondary windings wound upon the same core in such a manner as to obtain the necessary phase displacement as above described. Thus in obtaining the supply for two of the three phase rectifier units, namely two which have a 180 degrees phase displacement, the secondary is wound in the usual manner, whilst in obtaining a supply for the remaining four three-phase half-wave rectifiers each secondary phase winding of the transformer comprises two inductive windings connected in series which are coupled respectively to two primary phase windings of the transformer.

It will thus be seen that the fifth harmonic is less than 7 per cent of the fundamental as against 20 per cent in the case of the double-Y rectifier previously herein referred to. The other harmonics are similarly reduced. In addition the harmonics in the output circuit of the rectifier are reduced, the lowest output harmonic being the eighteenth. Such harmonics may of course be readily removed by means for example of choke coils and condensers. If desired a further reduction or elimination of the harmonics in the input circuit may be effected by means of tuned acceptor circuits connected between the lines and made resonant for example to the fifth and seventh harmonics. Whilst these desirable effects are obtained in the case where $N=3$ it will be understood that a much greater reduction in the harmonics in the input circuit may be obtained by making $N=5$ whereby for example three-phase supply is converted into 30-phase current before rectification. This further reduction is due to the fact that in any event there are no third, ninth and like harmonics in a three-phase half-wave rectifier whilst the fifth harmonic and multiples thereof are removed from the line by reason of the fact that N is equal to 5. The only remaining harmonics are 7th, 11th, 13th, 17th, the 19th, etc. and these are of relatively small amplitude. It will be appreciated that the power-factor of the supply will increase with M owing to the reduction of the harmonics.

To enable the invention to be clearly understood it will now be described with reference to the accompanying drawings, in which Fig. 1 is a diagram of one form of rectifier system in accordance with the present invention, namely, wherein an 18 phase system $Q=18$ or $N=M=3$, Fig. 2 comprises a series of vector diagrams illustrating how the 18-phase supply for the rectifier system shown in Fig. 1 may be obtained, Fig. 3 comprises a corresponding series of vector diagrams illustrating the relative phase displacements of the currents in the rectifiers shown in Fig. 1, Fig. 4 is a line current diagram for each pair of rectifiers shown in Fig. 1, and Fig. 5 is the resultant line current, being the sum of the currents shown in Fig. 4.

Figure 8:
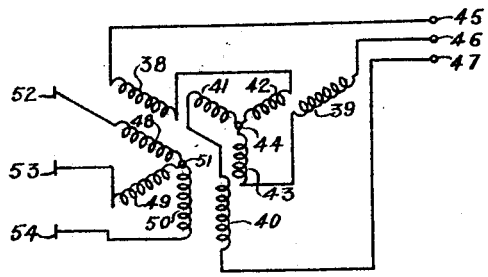

Fig. 6 is a diagram similar to Fig. 1 of another arrangement according to the invention, namely a 30 phase system wherein $Q=30$, or $N=5$ and $M=3$. Figs 7 and 8 illustrate two arrangements whereby the secondary voltage of a three-phase transformer suitable for the arrangement shown in Fig. 6 may be displaced from the primary voltage, Fig. 9 comprises a series of current diagrams Fig. 4, for the rectifier system shown in Fig. 6 and Fig. 10 is a diagram similar to Fig. 4 representing the resultant line current of the rectifier system shown in Fig. 6.

Referring to Fig. 1 which illustrates a system in accordance with the present invention, in which N equals 3 and three-phase current is to be rectified, that is $Q=18$, the input transformer 3 has six three-phase secondary windings which are electrically insulated from one another and so disposed that the current is converted into 18-phase current, since in this case, $2MN=18$. This 18-phase current is rectified by six three-phase half-wave rectifier groups which are phase-displaced with respect to one another by an angle $\theta$ which is equal to 20° as previously stated. The secondary windings 16, 17, 18, 19, and 20, 21 may be conveniently arranged in pairs, the windings of each pair being phase-displaced 180° with respect to one another, whilst the windings of each pair collectively are phase-displaced by 20° and 200° with respect to one another. The various corresponding phase-displacements 16ᵃ to 21ᵃ of the six three-phase rectifier units are shown in Fig. 3 whilst in Fig. 2 the method of obtaining the 18-phase supply is shown by vectors which are drawn parallel to one of the three vectors in the original three-phase supply. The length of each vector gives the voltage, which must be induced in the corresponding portion of the winding. In Fig. 2 the vectors 16ᵇ, 17ᵇ, 18ᵇ, 19ᵇ, and 20ᵇ, 21ᵇ correspond to the secondary windings 16, 17; 18, 19 and 20, 21 of the transformer 3. Thus each phase winding of the transformer comprises two inductive windings connected in series which are coupled respectively to two phase-windings of the transformer primary. For example, the direction of the vector in number 7ᵇ corresponds to the respective phase windings of the primary to which the secondary windings are coupled whilst the magnitude of the vector is proportional to the number of turns in the windings. Thus, for obtaining the 18-phase current, two of the secondary windings of the transformer, namely 16 and 17 are wound in the usual manner with a phase-displacement of 180° with respect to one another, whilst in obtaining a supply for the remaining four three-phase half-wave rectifiers each secondary phase winding comprises two windings connected in series, which are coupled respectively to certain pairs of primary phase windings.

The star points of each pair, such as 16 and 17, of secondary windings are connected together through an interphase reactance or choke coil 22 and the mid-point of the three interphase reactances 22 are connected through respective independent choke coils 23 to the terminal 9 of the rectified current output circuit. The cathodes 7 of the eighteen valves are all connected together to the terminal 8 of the output circuit. The harmonics are reduced in the manner previously herein stated.

Currents flowing in the various phase windings are shown in Fig. 4 in which curve A represents the component current in the line due to the dual rectifier unit 16, 17. Curves B and C of Fig. 4 are those of currents of the other rectifiers 18, 19 and 20, 21. Fig. 5 shows the resultant current in the line which is equal to the sum of the three components in curves A, B and C. The input current curve may be expressed by the series $f(x)=K$ (sin $wt + 0.06937$ sin $5 wt - 0.07601$ sin $7wt + 0.0485$ sin $11wt - 0.02669$ sin $13wt$ . . . . .)

It will be appreciated that a considerably greater reduction of the harmonics in the input may be obtained by making $N=5$ so that where $M=3$, $Q=30$, and such a system is shown in Fig. 6. The three-phase supply current is converted into 30 phase current which is rectified by 10 three-phase half-wave rectifiers. The secondary winding of the input transformer 3 has ten star-connected three-phase portions 25 to 34 inclusive. Such secondary windings may have their star-points connected together in pairs by means of five choke coils 22, the mid-points of which are connected by five conductors 35 with a five-phase star-connected choke coil 36, the star-point of which forms the terminal 9 of the rectified current output circuit. The other terminal 8 of the rectified current circuit is connected to the mid-point of the secondary winding 37 of a transformer which supplies alternating current to the cathodes of the valves, the primary winding of this cathode heating transformer not being shown.

In Fig. 7 a transformer arrangement is shown whereby the secondary voltage of a three-phase transformer may have the desired phase-displacement from the primary voltage. Each limb of the transformer core carries two sets of primary windings 38, 39, 40, 41, 42 and 43, connected at their inner ends to the primary star-point 44 and at their outer ends to the input terminals 45, 46, 47 and together, so that 38 and 43 are connected to 45, 39 and 41 to 46, and 40 and 42 to 47. The secondary windings 48, 49 and 50 are connected at their inner ends to a star-point 51 and at their outer ends to the anodes 52, 53 and 54. By suitably proportioning the numbers of turns on the windings 38, 39 and 40 with respect to 41, 42 and 43, the phase shift of the primary voltage with respect to that of the secondary may be made $$\pm \frac{2\pi}{30}$$

electrical radians or such multiple of this as is necessary for the 10 Y-rectifiers. A change of $$\pm \frac{2\pi}{3}$$

electrical radians may of course be effected by changing the connections to the line terminals.

In Fig. 8 two sets of primary windings are series-connected, instead of being connected in parallel in Fig. 7, the reference numerals being similarly applied to similar windings.

The arrangement shown in Fig. 8 has the property that in the event of a lack of balance occurring, owing to a valve becoming inoperative through burning out or becoming disconnected, there is a tendency to maintain the secondary current balance. The output therefore drops as all the valves take less current. The arrangement shown in Fig. 1 has the property of maintaining the secondary voltage balance, and upon a valve becoming inoperative the current through the remaining valves is unaltered.

Figure 9:
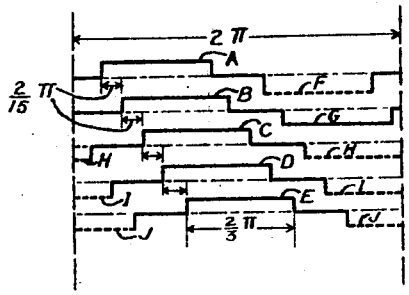
Figure 10:
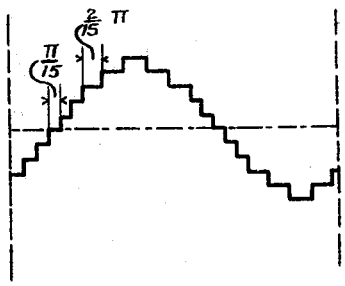

In Fig. 9 the curves A, B, C, D and E represent the primary current due to five corresponding valves in five of the half-wave rectifiers which are phase-displaced $2\pi/15$ electrical radians from each other, whilst the dotted curves F, G, H, I and J the current due to the five valves which are displaced $\pi$ electrical radians from the five valves corresponding to curves A to E inclusive. Fig. 10 shows the resultant current in one phase of the three-phase supply due to the ten valves mentioned in connection with Fig. 9. For conveniece of comparison the bases and scales in Figs. 9 and 10 are the same.

It will be seen that the resultant curve in Fig. 10 approximates fairly closely to a sine wave. In practice, owing to the stray field, or leakage inductance of the three 30-phase transformers and to any inductive impedance in the load, the corners of the steps of the curve in Fig. 10 are to a considerable extent rounded off, that is to say, the higher harmonics are reduced owing to the higher impedance which is offered to them in the transformers and in the inductive load. The approximation to a sine curve is therefore in practice still greater than appears from Fig. 10. There can be no even harmonics in the supply, because the harmonics which flow in any one three-phase half-wave rectifier are balanced in the transformer primary winding by those flowing in a three-phase half-wave rectifier which is phase displaced $\pi$ electrical radians with respect to the former. If third harmonics flowed, these would not constitute a system of polyphase currents by reason of the fact that third harmonics have a phase displacement of three times that of the fundamental, the fundamentals being represented by $\cos\theta, \cos(\theta+2\pi/3), \cos(\theta+4\pi/3)$. The third harmonic currents are proportional to $\cos\theta$, $\cos(\theta+2\pi)$, $\cos(\theta+4\pi)$, and are therefore in phase and do not undergo transformation in the three-phase transformers. A similar argument applies in the case of the fifth harmonics since the input to all the rectifying valves has a phase number composite with respect to five. The only harmonics which can flow in the primary winding are therefore the seventh, eleventh, thirteenth, seventeenth, nineteenth, twenty-third, etc., and these even in the absence of reactances have relatively small amplitude. The power factor of the rectifier is therefore substantially unity. If desired a further reduction may be made in the harmonics flowing in the input circuit by means of tuned acceptor circuits placed in multiple with the line, whilst the harmonics which flow in the output circuit are in no case lower than the thirtieth, and may be readily removed by means of choke coils and condensers.

It will be understood that various modifications may be made without departing from the scope of the invention. Thus M and N may have higher values than those given in connection with Figs. 1 and 6. Furthermore, if a supply current having a suitable number Q of phases is already available, the conversion from three-phase current such as herein described is unnecessary.

We claim as our invention:
1. An 18-phase rectifier system comprising 6 groups, each group comprising an operative 3-phase rectifier connection of thermionic valve devices, and means for causing each phase of said 3-phase rectifiers to carry current during substantially

$$\frac{2\pi}{3}$$

electrical radians per cycle.

2. An 18-phase rectifier system comprising 6 groups, each group comprising two star-wound three-phase windings, a thermionic valve connecting each of said phase windings with one of the output terminals of the system, and the star-point of the star-wound windings being connected with the other output terminal, the said windings in the system having their respective phases uniformly displaced about the cycle.

3. An 18-phase rectifier system comprising 6 groups, each group comprising two star-wound three-phase windings, a half-wave thermionic valve connecting each of said phase windings with one of the output terminals of the system, and the star-point of the star-wound windings being connected with the other output terminal, the said windings in the system having their respective phases uniformly displaced about the cycle.

In testimony whereof we have hereunto subscribed our names this 7th day of August, 1925.

ERNEST YEOMAN ROBINSON.
CECIL REGINALD BURCH.